Figure 1:
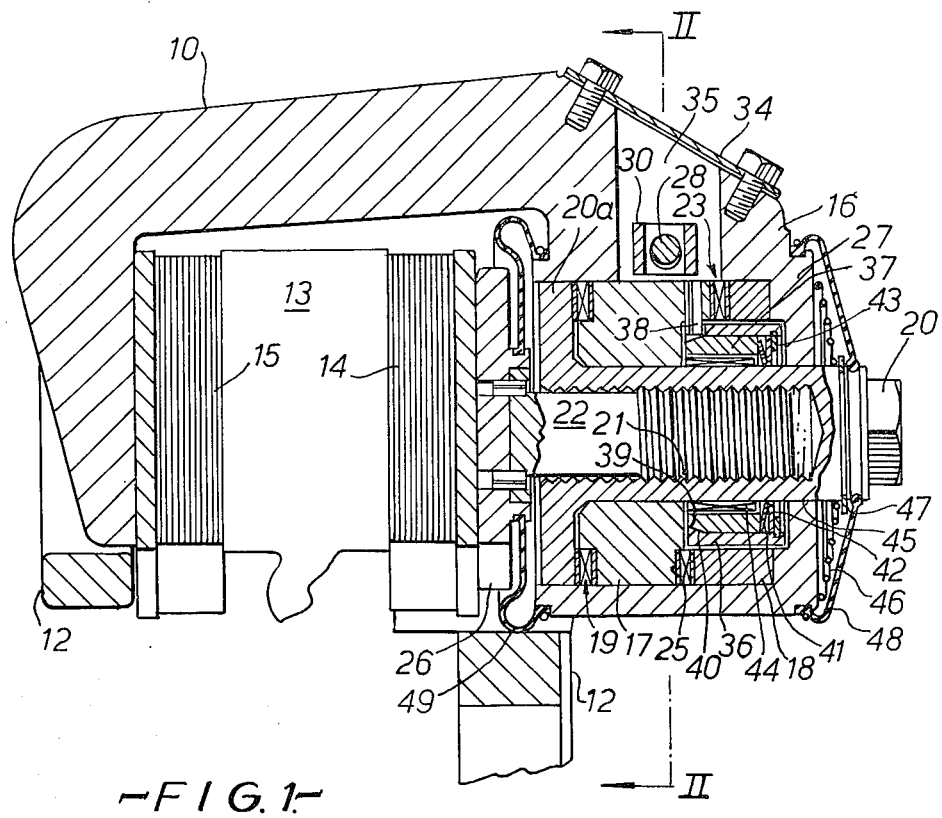

United States Patent [19]

Newstead et al.

[11] 3,952,844

[45] Apr. 27, 1976

[54] HELICAL CAM ACTUATOR FOR A DISC BRAKE

[75] Inventors: Charles Newstead, Walsall; Robert Joseph Warnock, Stourport-on-Severn, both of England

[73] Assignee: Girling Limited, Birmingham, England

[22] Filed: Jan. 13, 1975

[21] Appl. No.: 540,452

[52] U.S. Cl. ............................ 188/72.8; 192/93 A; 192/110 B
[51] Int. Cl.² ......................................... F16D 55/08
[58] Field of Search ............... 188/72.7, 72.8, 72.6; 192/93 R, 93 A, 110 B; 308/173, 235

[56] References Cited
UNITED STATES PATENTS

| | | | |
|---|---|---|---|
| 203,808 | 5/1878 | Williamson | 192/93 A |
| 1,332,487 | 3/1920 | Dale | 188/72.8 |
| 1,443,093 | 1/1923 | Sanderson | 188/72.8 |
| 2,061,787 | 11/1936 | Warner | 192/93 A |
| 3,243,016 | 3/1966 | Swift | 188/72.7 |
| 3,433,543 | 3/1969 | Eck | 308/235 |
| 3,543,285 | 11/1970 | Frigger | 188/72.7 |
| 3,701,400 | 10/1972 | Burnett et al. | 188/72.8 |
| 3,750,851 | 8/1973 | Rutter et al. | 188/72.8 |

*Primary Examiner*—Trygve M. Blix
*Assistant Examiner*—Edward R. Kazenske
*Attorney, Agent, or Firm*—Scrivener Parker Scrivener and Clarke

[57] ABSTRACT

A reaction type disc brake is provided with a mechanical actuator in the form of a helical thrust bearing whose nonrotatable cam component is part of or fixed relatively to the caliper. The rotatable cam component is housed in the caliper and is axially displaceable as well as rotatable therein. The rotatable cam component acts on the directly operated brake pad assembly via an axial thrust bearing and the reaction thrust is received directly by the caliper and applied to the indirectly operated brake pad assembly. The rotatable cam component is turned by means of a laterally flexible member which extends into the housing and which is placed under tension. The lateral flexibility accommodates the axial travel of the rotatable cam component. The helical thrust bearing comprises bearing needles disposed between helical cam tracks on the rotatable and nonrotatable components.

13 Claims, 4 Drawing Figures

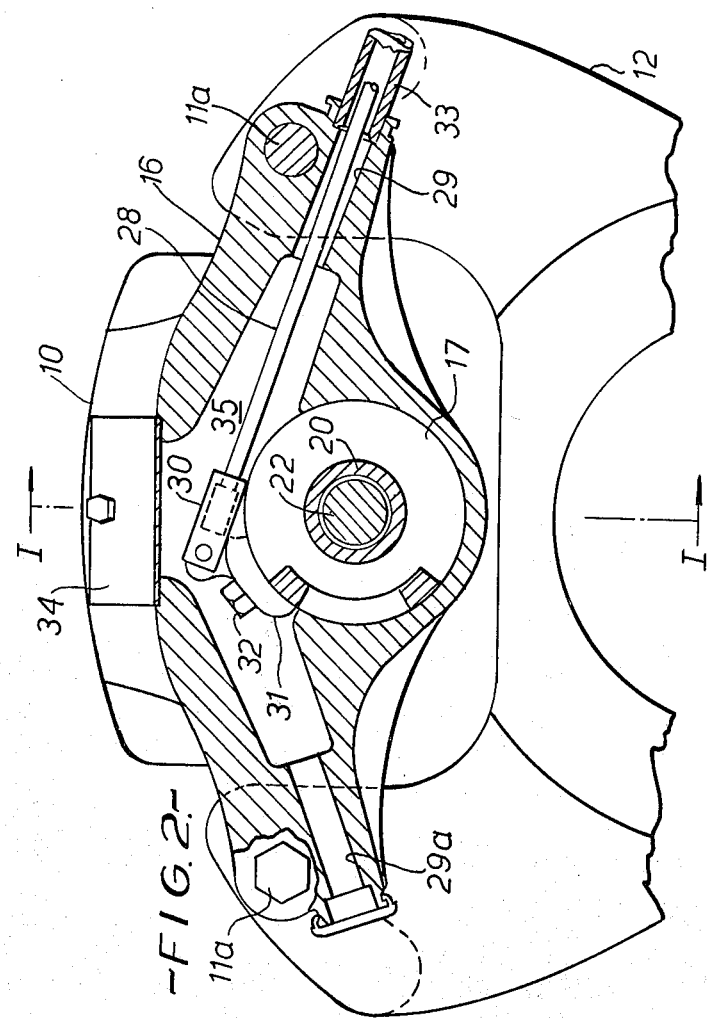

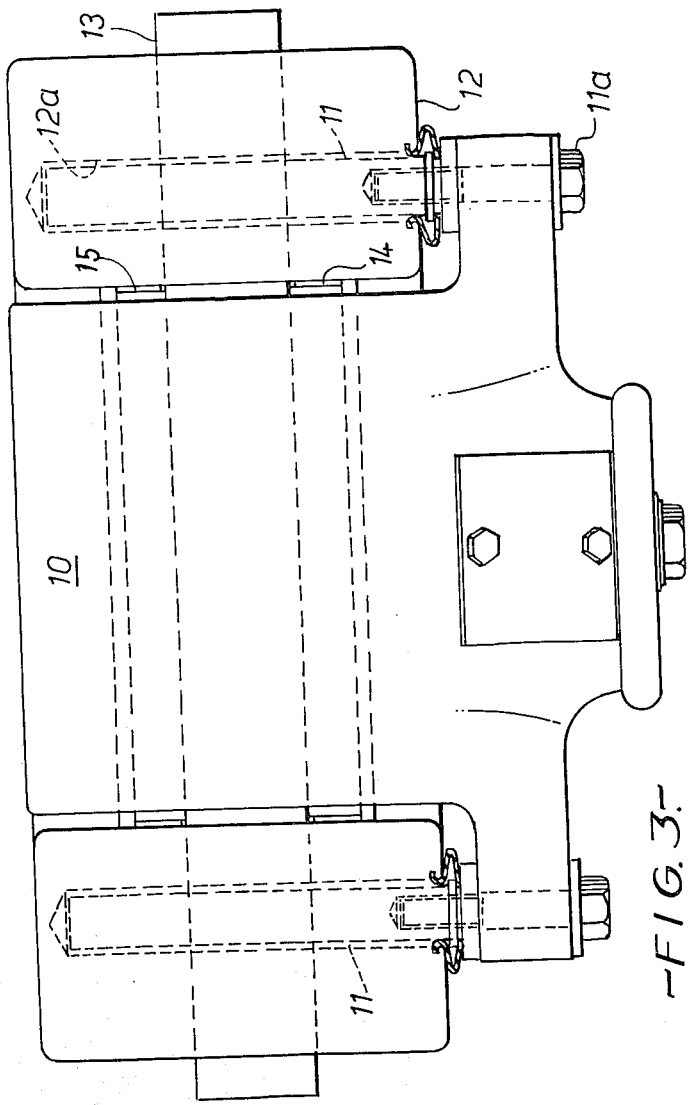

HELICAL CAM ACTUATOR FOR A DISC BRAKE

This invention relates to mechanical brakes, e.g. parking brakes and mechanical service brakes.

According to a first aspect of the present invention a mechanical brake actuator comprises a rotatable cam component having a helical cam track in axial cooperative relationship with a complementary helical cam track on a non-rotatable component, and rolling members between said cam tracks to form a helical thrust bearing such that rotation of said rotatable cam component in an appropriate direction effects axial displacement of that component relative to said non-rotatable component.

Preferably the rolling members comprise bearing needles.

The rotatable cam component can be provided at its end opposite the helical thrust bearing with an axial thrust bearing which may also be a bearing of the kind provided with rolling members, such as needle rollers.

According to a second aspect of the present invention, a mechanical actuator for a disc brake comprises rotatable and non-rotatable components in axial cooperative relationship with one another through at least one helically inclined surface such that rotation of said rotatable component in an appropriate direction effects axial brake-applying displacement of that component relative to said non-rotatable component, said non-rotatable component being part of or normally fixed relatively to a housing in which said rotatable component is disposed, and means extending into said housing and engaging said rotatable component for rotating the latter in said appropriate direction whilst permitting said axial displacement.

The last-mentioned means conveniently comprises a brake cable, brake rod or the like elongate member which passes through an opening in the housing and has sufficient lateral flexibility or mobility not to hinder said axial displacement, such elongate member being placed in tension for effecting said rotation in said appropriate direction.

According to a third aspect of the present invention, a mechanical actuator for a reaction type disc brake comprises rotatable and non-rotatable components in axial cooperative relationship with one another through at least one helically inclined surface such that rotation of said rotatable component in an appropriate direction effects axial brake thrust applying displacement of that component relative to said non-rotatable component, said non-rotatable component being part of or directly attached to a brake caliper to enable the caliper to receive the reaction to said brake thrust.

Conveniently a part of the caliper forms a housing in which the rotatable component is received, the rotatable component acting through a thrust bearing on a directly operated brake pad assembly which is opposite to an indirectly operated brake pad assembly on which the caliper acts.

The features of the mechanical actuators according to the second and third aspects of the invention can be combined with one another. Likewise the features of the actuator according to the second or the third aspect of the invention or according to the second and third aspects can be combined with the features according to the first aspect of the invention.

In prior art mechanical actuators of the kind comprising face cams, three rolling members, such as balls, are arranged at 120° apart in corresponding helically inclined grooves or ramps in the cam components. Tilting of the cam components relative to one another is thereby reliably avoided and the thrust is evenly distributed between the three balls. However the thrust which such a device is capable of attaining is limited by the Herzian stresses at the balls. To increase the diameter of the balls in order to reduce these stresses would require a corresponding increase in diameter of the whole assembly which may not be practical. It is also not practical to employ more than three balls because of the difficulty in machining the inclined grooves or ramps with sufficient accuracy to ensure even distribution of the thrust between the balls.

It is therefore one object of the invention to provide a mechanical brake actuator of the face cam type capable of producing an increased axial thrust.

Another object is to provide a mechanical actuator of the face cam type which has more than three rolling members, yet is cheap to manufacture.

A further object of the invention is to provide a mechanical actuator in which each face cam component has a single helical surface or ramp thereon and a plurality of rolling members is disposed between said helical or ramp surfaces.

Figure 4:
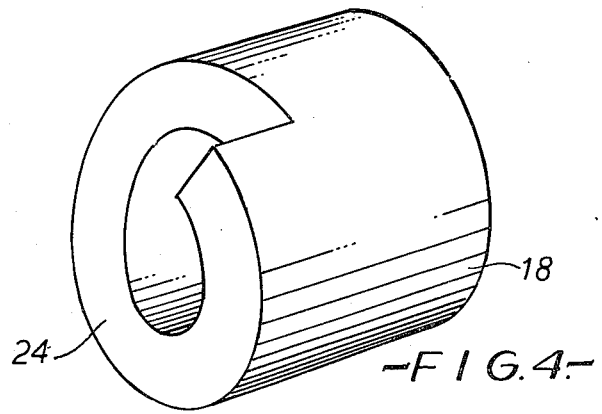

The invention is further described, by way of example, with reference to the accompanying drawings, in which:

FIG. 1 is a longitudinal section of a reaction type disc brake fitted with a mechanical actuator in accordance with one embodiment of the invention, the section being taken on the line I—I of FIG. 2, FIG. 2 is a section on the line II—II of FIG. 1, FIG. 3 is a plan view of the brake of FIGS. 1 and 2, and FIG. 4 is a perspective view of one component of the actuator shown in FIGS. 1 and 2.

Referring to FIGS. 1, 2 and 3 of the drawings, a reaction spot type disc brake for a vehicle comprises a caliper 10 slidably mounted by two axially parallel pins 11 on a fixed carrier 12 which can be mounted adjacent a brake disc 13. The pins 11 are attached to the yoke 10 by screws 11a and slide in bores 12a in the carrier 12. The carrier 12 itself straddles the disc so that it can take the torque directly from a directly operated brake pad assembly 14 and an indirectly operated brake pad assembly 15 disposed opposite one another on opposite sides of the disc 13.

The caliper 10 is formed as a casting which includes a housing 16 for a mechanical actuator comprising a rotatable component 17 and a non-rotatable component 18. The rotatable component 17 acts via an axial thrust bearing 19 on a flange 20a formed on the inner end of a nut member 20 forming part of an adjuster mechanism and in screw-threaded engagement via a non-reversible screw-thread connection 21 with a screw member 22. The non-rotatable actuator component 18 is fixed in the housing 16 but can alternatively be an integral part of the housing.

A helical thrust bearing 23 is formed between the actuator components 17 and 18. As shown in FIG. 4 the non-rotatable actuator component 18 has at one end a helical cam track 24. The rotatable actuator component 17 has a similar complementary cam track 25 parallel to the cam track 24. A plurality of needle rollers are arranged in a suitable cage between the cam tracks 24 and 25 to form the helical thrust bearing. The helical thrust bearing behaves in the same way as a screw in that, when the actuator component 17 is rotated in an appropriate direction (clockwise in FIG. 2) the actuator components 17 and 18 are urged axially apart by the helical thrust bearing 23. The resulting thrust is transmitted to the nut member 20 via the thrust bearing 19, which may also comprise needle rollers, and from the nut member 20 via the screw member 22 to a tappet member 26 which acts on the directly operated pad assembly 14. The tappet member 26 cannot rotate and is dowelled to the screw member 22 to prevent rotation of the latter. The reaction which is received by the actuator component 18 is applied directly to the end wall 27 of the housing 16 and thereby via the caliper 10 to the indirectly operated pad assembly 15. For turning the actuator component 17, a brake cable 28 extends laterally through an opening 29 in the housing 16 and its end is attached to a clevis 30 pivoted to a bracket 31 which is attached by a screw 32 to the component 17. The end of a sheath 33 of the cable 28 is anchored to the housing 16 around the opening 29. For accommodating similar components, a lateral opening 29a is provided at the other side of the housing 16 so that the same casting can be used for right and left hand brakes. A cover plate 34 closes a cavity 35 in the housing 16 accommodating the clevis 30 and the bracket 31.

The axial displacement of the actuator component 17 which accompanies the rotary movement thereof is accommodated by the lateral flexibility of the brake cable 28.

The adjuster mechanism besides the members 20 and 22 further comprises an outer annular member 36, an inner annular member 37 and a key 38 fitted to the actuator component 17. The key 38 is received with circumferential clearance in an axial slot or groove in the annular member 36 to form a rotary lost-motion connection between the component 17 and the member 36. The extent of the lost motion determines the desired brake slack as will be described hereinafter.

Complementary frusto-conical friction surfaces 39 and 40 on the outer and inner annular members 36 and 37 respectively are biassed into engagement with one another by a conical spring washer 41 to form a slipping clutch with a slip torque predetermined by the compression of the spring washer 41. The spring washer 41 is disposed between the member 37 and an abutment washer 42 held in place by a spring ring 43 received in an annular groove in the annular member 36. A so-called sprag clutch 44 is arranged between the annular member 37 and the nut member 20. A sprag clutch is a one way clutch and acts in a similar manner to a roller clutch. In other words the member 37 has a plurality of internal teeth having ramp surfaces which co-operate with rolling members or the like which in turn co-operate with the outer cylindrical surface 45 of the nut member 20.

A brake return spring 46 acts between the housing end wall 27 and the nut member 20 and is retained in place by a spring ring 47 received in a groove in the periphery of the nut member 20. The spring 46 and the right hand end (FIG. 1) of the actuator mechanism are protected by a flexible rubber cover 48 and the screw-thread connection 21 and the left hand end of the adjuster mechanism are protected by a flexible rubber cover 49.

To operate the mechanical actuator the brake cable 28 is placed under tension and the compressive reaction in the cable sheath 33 is received by the housing 16. The actuator component 17 is thereby turned clockwise in FIG. 2 and the consequential axial displacement (to the left in FIG. 1) relative to the housing 16 operates the brake as described above. So long as the brake slack does not exceed a desired value the rotary lost motion between the key 38 and the complementary slot in the annular member 36 is not taken up. Should the brake slack be excessive due to previous pad wear the circumferential lost motion or rotary lost motion at the key 38 is taken up. Before the brake is actually applied i.e. before the screw thread connection 21 and the actuator are subjected to axial load, advancing movement of the component 17 turns the outer annular member 36 which turns the nut member 20 via the friction clutch 39, 40 and the one-way clutch 44 to effect relative rotation at the screw thread connection 21 in a direction to reduce the brake slack.

When the brake is applied, the axial thrust produced at the helical thrust bearing 23 due to the rotation of the component 17 is transmitted through the screw-thread connection 21 to raise the frictional torque developed at the screw-thread connection and resist rotation of the nut member 20. The slip torque of the friction clutch 39, 40 is such that, when the brake thrust becomes appreciable, slipping takes place between the friction surfaces 39 and 40 and the nut member 20 turns no further. This ensures that the adjuster mechanism does not effect turning of the nut member 20 under heavy brake application when the deflection of the caliper 10 occurs. In other words adjustment may only take place when the brake thrust is relatively low or zero. The one-way clutch 44 ensures that the nut 20 is not turned back in the reverse direction (anti-clockwise in FIG. 2) when the brake is released. In other words reverse rotation of the annular member 36 which is effected when the brake is released and when the component 17 has been turned beyond the extent of the rotary lost motion is transmitted to the annular member 37 via the slipping clutch 39, 40 but is not transmitted to the nut member 20 due to the free wheeling of the one-way clutch 44 in this direction.

It will be noted that, by coupling an elongate member to the simultaneously rotatable and axially displaceable actuator component and permitting lateral mobility of the elongate member, the axial length of the brake can be reduced compared with those conventional mechanical brakes in which end levers, splined shafts etc. are provided for rotating the rotatable actuator component. Further the provision of an actuator component which is simultaneously rotatable and axially displaceable enables the brake reaction to be received directly by the end wall of the actuator housing.

The helical thrust bearing 23 can be very cheaply made from a conventional thrust bearing. All that is necessary is to split the roller cage and deform it into helical shape (with the rollers still captive in the cage if the bearing is of the type in which the rollers are held captive). Likewise the races of the conventional thrust bearing can be used for the helical thrust bearing 23, it being merely necessary to slit each race and deform it to helical shape. This enables a cheap mass-produced item to be used for the helical thrust bearing as opposed to the prior art face cams employing three balls in respective pairs of specially machined grooves in the cam components.

Since the helical thrust bearing 23 is basically a commercially available item (subject to the modification mentioned above), it is illustrated only diagrammati-

We claim:

1. In a vehicle brake system: a mechanical brake actuator comprising relatively rotatable cam components, two complementary axially cooperating parallel helical cam tracks respectively on said cam components, and a helical thrust bearing between said components comprising a plurality of rolling members between said two cam tracks said cam components being constructed and arranged that rotation of one of said cam components in an appropriate direction relative to the other of said cam components effects axial displacement of said one cam component relative to said other cam component.

2. A mechanical brake actuator according to claim 1 in which said rolling members comprise bearing needles.

3. A mechanical brake actuator according to claim 1 which includes a housing, said other cam component being non rotatable in said housing and said one cam component being rotatable in said housing.

4. A mechanical brake actuator according to claim 3 further comprising an axial thrust bearing disposed at the opposite axial end of said rotatable cam component to said helical thrust bearing.

5. A mechanical brake actuator according to claim 4 in which said axial thrust bearing comprises a plurality of needle rollers 6. A mechanical actuator for a disc brake comprising a housing which includes a first component, a second component rotatably disposed in said housing, two complementary axially cooperating parallel helical cam tracks respectively on said cam components, a helical thrust bearing between said components comprising a plurality of rolling members between said two cam tracks, rotation of said second component in an appropriate direction thereby effecting axial brake-applying displacement of that component relative to said first component, and means extending into said housing and engaging said second component for rotating the latter in said appropriate direction whilst permitting said axial displacement.

7. A mechanical actuator according to claim 6 in which the last-mentioned means comprises an elongate member which passes through an opening in said housing, said elongate member having lateral mobility so as not to hinder said axial displacement.

8. In a reaction type disc brake having a caliper: a mechanical actuator comprising a non-rotatable component on said caliper, a rotatable component housed in said caliper, two complementary axially cooperating parallel helical cam tracks respectively on said components, and a helical thrust bearing between said components comprising a plurality of rolling members between said two cam tracks, said components being constructed and arranged that rotation of said rotatable component in an appropriate direction thereby effects axial brake thrust applying displacement of that component relative to said caliper whereby the caliper directly receives the reaction to said brake thrust.

9. A mechanical actuator according to claim 8 in which said caliper includes a housing integrally formed therewith, said rotatable component being disposed in said housing, said disc brake including opposed directly and indirectly operated brake pad assemblies and said actuator including a thrust bearing by which said rotatable component acts axially on said directly operated brake pad assembly, said caliper acting on said indirectly operated brake pad assembly.

10. A mechanical actuator according to claim 8 which further comprises an elongate member which passes through an opening in said housing, said elongate member having lateral mobility so as not to hinder said axial brake thrust applying displacement.

11. A mechanical actuator according to claim 9 which includes an elongate member extending into said housing and engaging said rotatable component for rotating the latter in said appropriate direction, said elongate member having lateral mobility so as not to hinder said axial displacement of said rotatable component.

12. A mechanical actuator according to claim 1 in which said helical thrust bearing further comprises a cage for said rolling members, said cage having a circumferential discontinuity.

13. A mechanical actuator according to claim 1 in which the rolling members disposed between said two cam tracks exceed three in number.

* * * * *